Feb. 10, 1942.     A. J. CORSON ET AL     2,272,766
MAGNETIZING ARRANGEMENT
Original Filed April 7, 1939
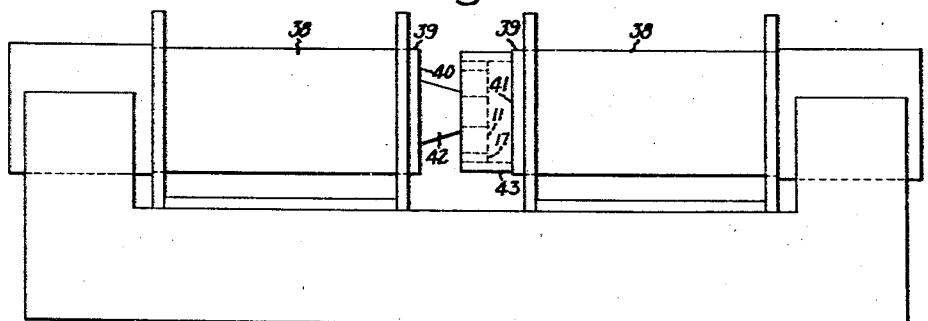
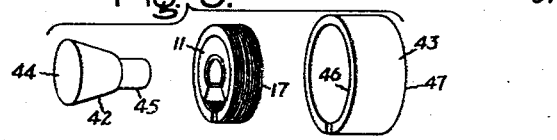
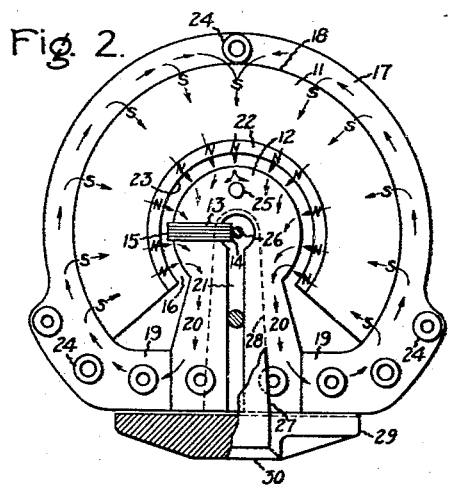
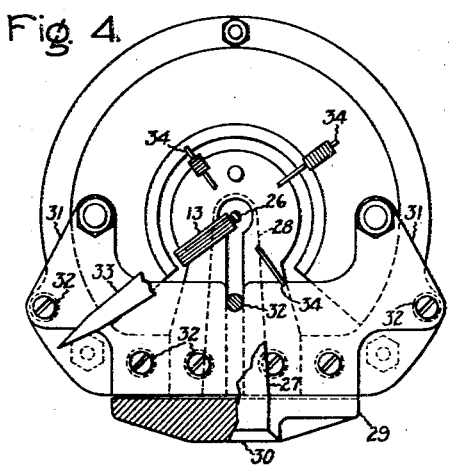
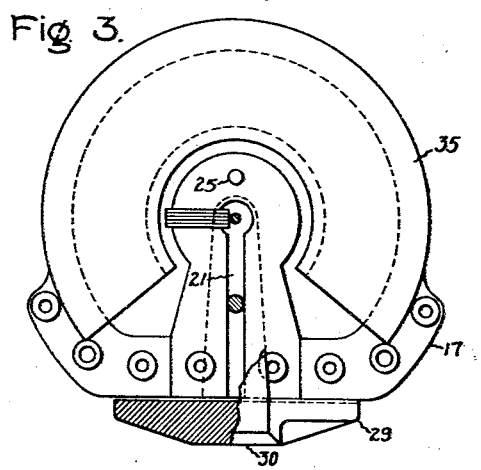
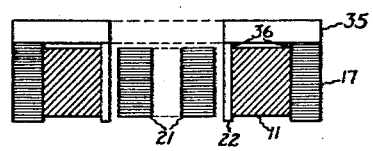
Inventors:
Almon J. Corson,
Ralph M. Rowell,
by *Harry E. Dunham*
Their Attorney.

Patented Feb. 10, 1942

2,272,766

UNITED STATES PATENT OFFICE 2,272,766

MAGNETIZING ARRANGEMENT

Almon J. Corson, Swampscott, and Ralph M. Rowell, Lynn, Mass., assignors to General Electric Company, a corporation of New York Original application April 7, 1939, Serial No. 266,626. Divided and this application June 26, 1940, Serial No. 342,576

3 Claims. (Cl. 175—21)

This application is a division of our copending application, Serial No. 266,626, filed April 7, 1939, D. C. ammeter and voltmeter.

Our invention relates to electrical instruments and concerns particularly current responsive devices adapted for use in direct current circuits.

It is an object of our invention to provide an improved arrangement for magnetizing the magnets of current responsive instruments, particularly those having a long scale as great, or greater, than 250 degrees in angular length, utilizing radially magnetized annular magnets.

Other and further objects and advantages will become apparent as the description proceeds.

In carrying out our invention in its preferred form, we provide an annular permanent magnet having a peripheral length of substantially 260 degrees composed of high coercive force magnetic material magnetized radially so that poles of opposite polarity are formed at the outer and inner cylindrical surfaces of the magnet and we provide an inner annular member or pole piece which is mounted within the magnet and spaced therefrom to form an annular air gap. We also provide a current conducting coil which links the annular pole piece, has a side passing through said pole piece substantially along the axis of said pole piece and said magnet, is rotatable about said side and has another side adapted to sweep through the annular air gap. Suitable means are, of course, provided for forming a magnetic return circuit between the annular inner pole piece and the outer surface of the annular magnet. An indicating pointer may be connected to the rotatable coil in accordance with the customary practice, and in this manner an indicating instrument is formed having a scale range as great or greater than 250 degrees in angular length.

Our invention may be understood more readily from the following detailed description when considered in connection with the accompanying drawing and those features of the invention which are believed to be novel and patentable will be pointed out in the claims appended hereto. In the drawing Figure 1 is a schematic diagram of apparatus which may be utilized for magnetizing the permanent magnets used in our current responsive instruments. Figure 2 is an elevation of an instrument unit or torque-producing unit for a current responsive indicating instrument forming one embodiment of our invention, certain portions of the remaining structure of the complete instrument being shown fragmentarily or in section. Figure 3 is an elevational view of the apparatus of Figure 2 together with a magnetic keeper which may be utilized for preserving the strength of the permanent magnet during assembly of the apparatus, or when for any reason the apparatus is disassembled. Figure 4 is an elevational view corresponding to Figure 2 but showing additional details of construction of the supporting frame and other parts of a complete indicating instrument. Figure 5 is a horizontal transverse section of the magnetic flux-carrying members shown in Figure 3, and Figure 6 is an exploded diagrammatic perspective view of a portion of the apparatus of Figure 1, including a portion of an instrument being magnetized. Like reference characters are utilized throughout the drawing to designate like parts.

Referring now more in detail to the drawing, we have shown in Figure 2 a torque producing element of an indicating instrument, such as a voltmeter or an ammeter. There is a radially magnetized annular permanent magnet 11 cooperating with an annular pole piece 12, mounted within the magnet 11, and a current conducting coil 13 eccentrically mounted to rotate about one of its sides 14 while linking the annular pole piece 12 and having another side 15 sweeping through an air gap 16 formed between the permanent magnet 11 and the inner annular pole piece 12. It will be understood that the outer cylindrical surface of the annular pole piece 12 is spaced sufficiently from the inner surface of the pole piece of the magnet 11 to provide an annular air gap of sufficient width for the side 15 of the coil 13.

For the dual purpose of shielding the instrument and forming a return magnetic path, a member 17 is provided which may be substantially ring-shaped having a surface abutting the outer cylindrical surface 18 of the magnet 11 and having ends 19 brought into magnetic connection with the inner annular pole piece 12. To facilitate providing a compact structure the annular magnet 11 may have a segment thereof, preferably not more than 100 degrees in angular length, cut out to permit flux-carrying members 20 to extend radially from the inner annular pole piece 12 to the shielding or ring member 17, and for the sake of convenience in assembly, the ring member 17 may also have a segment at the bottom cut out so that the flux-carrying members 20 are fitted against transverse surfaces at the ends 19 of the ring member 17. The magnet 11 may thus be referred to as a segmental annulus. For the sake of greater efficiency and greater ease in obtaining accuracy of construction in the manufacturing process, the annular pole piece 12 and the flux-carrying members 20 are preferably made integral to form a U-shaped core member designated by the reference numeral 21, and consisting of an annular yoke portion 12 and leg portions 20. For the sake of facilitating the provision of uniform pole strength along the inner cylindrical surface of the permanent magnet 11, an annular pole piece 22 is preferably provided having an inner cylindrical surface 23 uniformly spaced from the outer cylindrical surface of the annular pole piece 12.

The permanent magnet 11 is preferably composed of a material having a relatively high coercive force such as either cast or sintered material composed, for example, of an alloy of iron, nickel, aluminum and cobalt, such as described in United States Patents 1,947,274 and 1,968,569 to Ruder. Various modifications in specific percentages of the several constituents may be employed.

Suitable means are preferably employed for uniting the permanent magnet 11 with the pole piece 22 and the ring member 17 to form a unitary magnetic field member. If a cast magnet is to be used the unitary field member is produced by die-casting the magnet 11 into a form or mold in which the pole piece 22 and the ring member 17 have been inserted. In the case of sintered magnets, the sintered material is pressed into a mold having the pole piece 22 and the ring member 17 as inserts and is thereupon subjected to suitable heat and pressure.

The pole piece 22 is composed of any suitable magnetic material which is relatively permeable. Such a material as an alloy of 78½ per cent nickel with the remainder iron may be utilized but satisfactory results may also be obtained by utilizing cold rolled steel.

The ring member 17 and the U-shaped core member 21 are likewise preferably composed of magnetic material having relatively high permeability, such as the nickel-iron alloy mentioned, or soft steel. For the sake of convenience in manufacture and accuracy of surface contour and alignment the members 17 and 21 may be made up of punched steel laminations stacked together and secured in any suitable manner, as by means of nonmagnetic hollow rivets 24 composed of brass, for example, and a rivet 25 at the yoke portion of the core member 21, which need not be a hollow rivet. It will be understood that the hollow rivets are utilized for the sake of convenience in mounting on the supporting structure by bolts or screws.

For supporting the eccentrically rotatable coil 13, a shaft 26 may be provided which is coaxial with the annular magnet 11 and the annular inner pole piece 12 and is supported between suitable jewel bearings, not shown, which are carried by front and back bracket members 27 and 28, respectively, the former being represented only fragmentarily and the latter being shown by hidden or dotted lines.

It will be understood that a suitable supporting frame composed of nonmagnetic material is provided for furnishing rigid support to the magnetic flux-carrying members and the bearings supporting the movable elements. Such a frame is shown fragmentarily at 29. Inasmuch as our invention does not reside in the specific details of the arrangement for providing structural support, the frame 29 need not be described or illustrated in detail. It may be similar to that shown in the copending application of one of the joint applicants Almon J. Corson, Serial No. 236,891, filed October 25, 1938, in which the frame is E-shaped having relatively long upwardly extending arms 27 and 28 at each end of a horizontally extending base 30 and having intermediate of the base 30 an upwardly extending bracket 31 (Figure 4) to which the ring member 17 and the core member 21 may be secured by suitable bolts or screws 32. It will be understood that a suitable protective case may be provided and that a suitable indicating scale may be mounted in the case.

If the apparatus is to be in the form of an indicating instrument, it will be understood that a suitable pointer 33 (fragmentarily shown in Figure 4) may be provided for cooperating with the scale. As will be understood by those skilled in the art, the pointer 33 is carried by the shaft 26 and, if desired, counterweight carrying arms 34 may also be secured to the shaft 26 for the purpose of balancing the pointer 33 and the coil 13. Likewise a suitable biasing spring, not shown, may be secured to the shaft 26 for returning the pointer 33 to the zero position and producing the necessary restraining torque. Although we have described our invention in connection with an embodiment in the form of an indicating measuring instrument, it will be understood that our invention is not limited thereto and obviously includes various types of current responsive instruments such as contact-making voltmeters and ammeters, relays, telemeters and recorders.

Inasmuch as high coercive force magnetic material, such as that of which the magnet 11 is preferably composed is relatively sensitive to a great increase of the external magnetic reluctance, I preferably provide a keeper 35 of permeable magnetic material for shunting the external magnetic circuit of the magnet 11 before the core 21 is inserted, or whenever for any reason the apparatus is disassembled. It will be understood, of course, that the keeper 35 is applied immediately upon the magnetization of the permanent magnet 11 before any demagnetizing field appears and that the keeper 35 is removed only after the core 21 has been inserted to provide the flux path for the magnet 11 in order to prevent weakening the latter. In order to facilitate the use of the magnetic keeper 35 the shielding ring 17 and the annular pole piece 22 are caused to project slightly in the axial direction beyond the magnet 11, as shown at 36 in Figure 5, to provide contact surfaces meeting the surface of the keeper 35. It will be understood, of course, that the heads of the rivets 24 fastening the laminations of the shielding ring 17 together are properly countersunk to leave a flat surface for contacting the keeper 35. As shown in Figure 3 the keeper 35 is substantially in the shape of a flat washer with a segment thereof cut out to correspond to the shape of the permanent magnet 11, and the opening or the gap in the keeper 35 is made large enough to facilitate sliding the keeper on to the magnet structure before the latter is removed from the magnetizer, as will be explained in connection with Figures 1 and 6.

It will be apparent that our construction lends itself readily to easy, rapid, and accurate assembly of current responsive instruments. The shaft 26, carrying the current conducting coil 13 and the pointer 33, is first mounted within the bearings carried by the frame arms 27 and 28. The coil 13 is turned to the horizontal position as shown in Figure 2 and the core 21 is then linked with the coil by passing one of the legs 20 through the coil 13, whereupon the core 21 is bolted to the bracket 31 by bolts such as the bolts 32 (Figure 4). After the permanent magnet 11 has been magnetized, while the keeper 35 is still in place, the unitary permanent magnet structure consisting of the magnet 11, the pole piece 22 and the shielding ring 17 is passed axially toward the core 21 and the coil 13 so as to surround them and is also secured to the frame bracket 31 utilizing the bolts 32 which pass through the frame bracket 31. After the torque producing unit which is shown in Figure 3 has been assembled the keeper 35 may be removed by drawing it away in an axial direction.

For the purpose of magnetizing the permanent magnet 11 an arrangement such as that shown in Figure 1 may be employed. This consists of a magnetic yoke 37 of any desired shape provided with one or more exciting windings or solenoids 38 suitably placed thereon and having a pair of pole pieces 39 with confronting parallel surfaces 40 and 41. It will be understood, of course, that the yoke 37 and the pole pieces 39 are preferably made of permeable magnetic material and that the solenoids 38 consist of numerous turns of current conducting wire adapted to be connected to a current source, not shown, in order that the extremely high magnetizing force required for magnetizing the high coercive force permanent magnet material may be provided. In order to pass the magnetizing flux from the pole pieces 39 radially through the permanent magnet 11 and in order to facilitate easy insertion of the magnet unit in the magnetizer of Figure 1, a pair of auxiliary movable pole pieces 42 and 43 is provided, one of which, the movable pole piece 42, is substantially in the shape of a truncated cone with a cylindrical continuation. The pole piece 42 has a flat surface 44 adapted to abut the pole face 40 of the magnetizer and has a cylindrical portion 45 of the proper size and shape to provide a slip-fit in the inner surface 23 of the pole piece 22 forming the inside pole face of the permanent magnet 11. The removable pole piece 43 is in the approximate shape of a ring, having an inner surface 46 so shaped as to form a slip-fit around the shielding ring 17 and having a plane surface 47 adapted to fit against the pole face 41 of the magnetizer. It will be understood that in Figure 6 in which the parts are shown schematically in reduced size, the shielding ring 17 and the removable pole piece 43 have apparently been represented with substantially cylindrical cooperating surfaces although actually, as shown in Figure 2, the contour departs from a circular cross section.

As will be well understood by those skilled in the art it will be necessary to subject the permanent magnet 11 to a magnetizing field much greater than that which it is expected to maintain in order to magnetize it to its practical limit. After the permanent magnet 11 has been magnetized and the current passing through the solenoids 38 has been cut off, the high permeability magnetic circuit of the magnetizer consisting of the yoke 37 and the pole pieces 39, 42 and 43, of course, provides a low reluctance magnetic return path which prevents subjecting the permanent magnet 11 to the demagnetizing force of its own poles. Before removing the permanent magnet 11 from magnetizer in Figure 1, the keeper 35 shown in Figures 3 and 5 is slipped in place by passing it radially along the face of the permanent magnet 11 and the removable pole piece 43, whereupon the keeper provides the magnetic return path of the permanent magnet 11. Then the permanent magnet 11, the keeper 35 and the removable pole pieces 42 and 43 are slipped out sidewise as a unit from between the pole pieces 39 of the magnetizer of Figure 1. Thereafter, the removable pole pieces 42 and 43 may be slipped off by passing them in axial directions. The removable permanent magnet and keeper may then be brought into place in the torque-producing unit of Figure 3 as previously explained.

In accordance with the provisions of the patent statutes, we have described the principle of operation of our invention together with the apparatus which we now consider to represent the best embodiment thereof but we desire to have it understood that the apparatus shown is only illustrative and that the invention may be carried out by other means.

What we claim as new and desire to secure by Letters Patent of the United States is:

1. Magnetizing apparatus for an annular permanent magnet comprising in combination a magnetic yoke having a pair of flat confronting pole faces, means for magnetizing the yoke, a pair of removable pole pieces and a keeper, one of said removable pole pieces having a surface adapted to abut one of said pole faces and the other having a surface adapted to abut the other of said pole faces, one of said pole pieces having a portion with a cylindrical surface adapted to extend inside an annular magnet to be magnetized and the other of said pole pieces being in substantially ring form having an inner surface adapted to surround an annular magnet to be magnetized, said keeper being substantially in the form of a flat annulus with a sector thereof removed to leave an open side, said annulus being of such size that it may be used for bridging the inside and outside pole faces of an annular magnet to be magnetized, and the opening in the side thereof being of such size that the keeper may be slipped over the said cylindrical surfaced portion of one of said pole pieces to bridge a magnet being magnetized without removing the same from the magnetizing apparatus.

2. The method of producing a high coercive force permanent magnet with a concave pole face lying along a cylindrical surface which method comprises forming high-coercive-force permanent-magnet material into a segment of an annulus, securing to the inner cylindrical surface of the annulus a pole piece of relatively permeable magnetic material, securing to the outer cylindrical surface of the annulus a shield ring of relatively permeable magnetic material, causing said pole piece and said shield ring to project from the side surface of the annulus and lie along a plane offset from the side surface of the annulus and substantially perpendicular to the axis of the annulus, forming a closed external magnetic circuit from the inner face of the magnet pole piece to the outer surface of the shield ring, inducing a strong magnetomotive force in said closed circuit to magnetize the permanent magnet material, deenergizing the magnetomotive force and passing a keeper in the form of a flat annulus, with a sector thereof cut out, along the plane surface of said shield ring and said magnet pole piece to bridge the magnetic circuit therebetween before opening the external magnetic circuit from the inner surface of the pole piece to the outer surface of the shield ring.

3. In a field structure for a current responsive instrument of the permanent magnet type arranged for retention of magnetic strength normally having a soft-iron core substantially closing the magnetic circuit, the combination of a permanent magnet assembly and a keeper therefor adapted to bridge the permanent magnet assembly without interference with the placement of the permanent magnetic assembly in magnetizing apparatus or with the installation of an instrument core in the permanent magnet assembly, said permanent magnet assembly comprising a segmental annular permanent magnet magnetized radially, a shielding and magnetic return member substantially surrounding said permanent magnet and making contact with the outer cylindrical surface thereof, and an inner pole piece in the form of a segment of a hollow cylinder at the inner cylindrical surface of said permanent magnet, said magnetic return member and said inner pole piece projecting axially from said permanent magnet and having surfaces lying along the same plane, and said keeper being in the form of a hollow disc having a segment thereof cut away and having a flat surface adapted to be brought into contact with the projecting surfaces of said magnetic return member and said inner pole piece for bridging said permanent magnet when said permanent magnet assembly is removed from a magnetizer and is without a magnetic-circuit-completing core, the inner dimensions of said keeper being no less than those of the said inner pole piece in order to avoid interference with installation or removal of an instrument core or a core member of a magnetizer.

ALMON J. CORSON.
RALPH M. ROWELL.